United States Patent [19]
Fujita et al.

[11] Patent Number: 4,870,429
[45] Date of Patent: Sep. 26, 1989

[54] OPTICAL FOAM-SPACER DISK ASSEMBLY

[75] Inventors: Tsutomu Fujita, Toyonaka; Yoshiaki Togawa, Kyoto; Seimei Yasui, Takarazuka; Toshitsugu Kikuchi, Ibaraki, all of Japan

[73] Assignee: Sumitomo Chemical Company, Limited, Osaka, Japan

[21] Appl. No.: 20,743

[22] Filed: Mar. 2, 1987

[30] Foreign Application Priority Data

Mar. 5, 1986 [JP] Japan ................................. 61-47818

[51] Int. Cl.$^4$ .......................... G01D 15/34; G11B 5/10; G03C 1/00
[52] U.S. Cl. ...................................... 346/137; 369/284; 428/694; 428/913; 430/495; 430/945
[58] Field of Search ............................ 346/135.1, 137; 369/284; 427/162; 428/694, 913; 430/495, 945

[56] References Cited

U.S. PATENT DOCUMENTS

| | | | |
|---|---|---|---|
| 4,074,282 | 2/1978 | Balas et al. | 346/135.1 |
| 4,555,716 | 11/1985 | Odawara et al. | 346/137 |
| 4,564,850 | 1/1986 | Kazuharu | 346/137 |

FOREIGN PATENT DOCUMENTS

| | | |
|---|---|---|
| 0109245 | 5/1984 | European Pat. Off. |
| 3337527 | 4/1984 | Fed. Rep. of Germany |
| 59-71146 | 4/1984 | Japan |

OTHER PUBLICATIONS

Materials Handbook, George S. Brady, McGraw Hill Book Co., pp. 643–649, 9th Ed., 1959.
Electro and Mini/Micro Northeast, Apr. 23–25, 1985, pp. 2–3, Eastman Kodak Co., N.Y., U.S., A. B. Marchant: "Optical Disk Trade-Offs".
Proceedings of the SID, vol. 24, No. 1, 1983, pp. 17–23, SID, Los Angeles CA., U.S.; A. E. Bell, "The Design and Optimization of the Optical Data Disk".

*Primary Examiner*—E. A. Goldberg
*Assistant Examiner*—Gerald E. Preston
*Attorney, Agent, or Firm*—Stevens, Davis, Miller & Mosher

[57] ABSTRACT

An optical disk is provided which comprises two sheets of substrates; or two sheets of substrate and a reinforcing plate or a reinforcing rim; or one sheet of substrate and a reinforcing plate; which are bonded to form an integrated body having a spacer interposed therebetween, said spacer being made of elastomeric foam having a specific gravity of not more than 1.5 and an expansion ratio of not less than 1.5 as the material of the said spacer. This optical disk has a high adaptability of the drive and exhibits a high reliability, i.e. excellent vibration restricting performance, thereby being possible to provide a stable and highly accurate information processing.

14 Claims, 3 Drawing Sheets

OPTICAL FOAM-SPACER DISK ASSEMBLY

BACKGROUND OF THE INVENTION

This invention relates to an optical disk used as a high density information memory medium including a video disk, a disk for digital codes and the like.

Optical disks mostly used nowadays are of an air-sandwich structure. This is a structure in which a thin film comprising a recording material is coated on a substrate of glass, plastics, etc., and, in the case of double sided media, two such substrates are bonded at the inner and the outer peripheral part respectively through the medium of a spacer, the recording films being made to face to face each other, to form an integrated body.

As the material of the above-mentioned spacer, there have been used up to now those which have a high rigidity of approximately the same magnitude as that of the substrate, which include, in the case of plastic substrates, for example, polymethyl methacrylate, polycarbonate and the like.

As the dynamic characteristics of an optical disk, there are restrictions as to the dynamic axial runout and the acceleration of dynamic axial runout of the disk, depending on the servo performance of an optical head. Although not yet standardized, there are set as a criteria, for example in an optical disk of 130 mm outside diameter, for example a value within the range of ±250 μm (<500 Hz) and ±0.2 μm (>1.5 KHz) for dynamic axial runout and 20 m/sec² or less for acceleration of dynamic axial runout.

When the above-mentioned optical disk is allowed to run on an information recording-playback apparatus (hereinafter referred to as "drive"), the optical disk is usually rotated at a revolution speed of 200 to 3600 rpm by means of a spindle motor. In this case, the optical disk receives the vibration of the spindle motor, depending on the type and the quality of the drive, and the environment in which it is used; and there arises the possibility of a resonance phenomenon occurring when the resonance point of the optical disk coincides with the vibration frequency of the drive. Consequently, under certain circumstances, there is the apprehension that the dynamic axial runout and the acceleration of dynamic axial runout exceed specified values, going above the servo control range of the optical head, and resultantly the reading and writing of information become impossible.

Further, Japanese Patent Application (Kokai) No. 71146/84 discloses that an elastomeric material as a spacer of air-sandwich optical disk comprising a substrate and a reinforcing plate is used. This purpose is to prevent a distortion of the substrate caused by a difference of thermal expansion between the substrate and reinforcing plates.

However, the present inventors found that when the spacers formed of elastomeric material were used, the optical disk had not an excellent vibration restricting performance enough to satisfy in a practical use. Accordingly, an optical disk which is free from such a problem is eagerly desired.

SUMMARY OF THE INVENTION

The object of this invention is to provide an optical disk which has a high adaptability to the drive and shows a high reliability, i.e. an excellent vibration restricting performance, and which makes a stable and highly accurate information processing possible even when the vibration of the spindle motor etc. is present to some extent on the drive side.

According to this invention, there is provided an optical disk comprising two substrates, or two substrates and a reinforcing plate or a reinforcing rim, or a substrate and a reinforcing plate, bonded to form an adhesively integrated body having a spacer interposed therebetween, characterized in that are elastomeric foam is used as the material of the said spacer.

DETAILED DESCRIPTION OF THE PREFERRED EMBODIMENTS

This invention is based on the finding that an optical disk which can overcome most of the difficulties mentioned above and has a high reliability and a more excellent vibration restricting performance can be prepared by using an elastomeric foam as the material of the spacer for an optical disk of air-sandwich structure.

This invention will be further described in detail below.

The materials of the substrate of the optical disk used in this invention are glass or plastics which have a good transparency and a low degree of birefringence, such as methyl methacrylate polymers and polycarbonates. Particularly in case of optical plastic substrates, the effect of this invention is markedly exhibited.

The elastomer used as a raw material of the spacer in this invention has a glass transition temperature (hereinafter abbreviated as Tg) of preferably not higher than 30° C, more preferably not higher than 0° C, and a reversible elastic region of strain of preferably 1 to 2,000%, more preferably 10 to 1,000%. Specific examples of the elastomers include natural rubber, chloroprene rubber, nitrile rubber, polyisoprene, polybutadiene, ethylene-propylene rubber, butyl rubber, silicone rubber, ethylene-vinyl acetate copolymer, styrene-butadiene rubber and the like. These elastomers may, as occasion demands, be incorporated with fillers such as silicic acid, silicates, clay, talc, carbonates, alumina hydrate, and barium sulfate. Further, the elastomers may optionally be suitably strengthened by vulcanization. These materials are processed into an expanded form having a specific gravity of not more than 1.5, more preferably not more than 0.5. Although the specific gravity is not particularly limited as to its lower limit, it is preferably not less than 0.1 and more preferably not less than 0.15; whereas a material of too small a specific gravity gives a poor shape retention.

The expansion ratio of the foamed material is preferably 1.5 to 15, more preferably 3 to 10 and most preferably 3 to 6.

When the material is not in an expanded form or, even when expanded, is of a smaller expansion ratio than the above-mentioned range, the effect of this invention is not exhibited sufficiently; whereas a material of too large an expansion ratio gives a poor shape retention.

The above-mentioned foamed material can be easily prepared by known methods.

The thickness of the spacer is preferably not less than 0.2 mm, more preferably not less than 0.4 mm, become when the thickness is too small the effect of this invention is not exhibited sufficiently. On the other hand, the upper limit of the thickness is restricted by such factors as the thickness of the substrate and the total thickness of the optical disk, and may be suitably determined in consideration of these factors. Usually it is not more than 6.0 mm.

Figure 1:
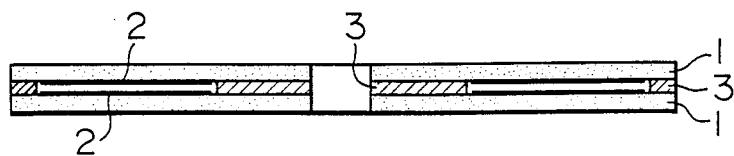
FIGS. 1, 2 and 3 are each a sectional view of an optical disk of air-sandwich structure.
Figure 2:
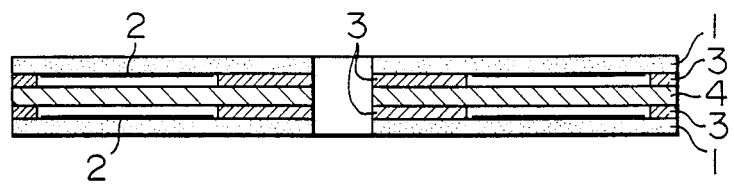
Figure 3:
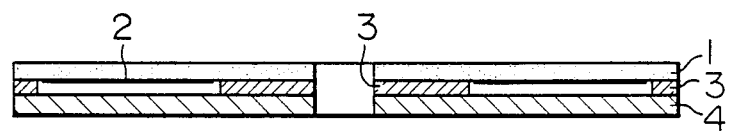

Some examples of the optical disks according to this invention are shown in attached drawings. FIG. 1 is a sectional view of a double sided recording optical disk comprising two substrates 1, each provided with a recording medium thin film layer 2, bonded with an adhesive through the medium of circular spacers 3 disposed at the inner and the outer periphery, said recording medium thin film layers 2 facing inside with each other, to form an integrated body. FIG. 2 is a sectional view of an optical disk bonded to form an integrated body with a reinforcing plate 4 as a core. FIG. 3 is a sectional view of a single sided recording optical disk comprising one substrate 1 and a reinforcing plate 4 bonded through the medium of a circular spacer 3 to form an integrated body.

The material used for the above-mentioned reinforcing plate is usually the same as that of the substrate, but it is not limited thereto.

The optical disk of this invention is excellent in the vibration restricting performance and hence shows a good adaptability to a drive. Thus, an optical disk of high reliability can be obtained.

This invention will be further specifically described in detail below with reference to Working Examples and Comparative Examples, but it is not limited thereto.

EXAMPLE 1

An optical disk was prepared, as shown in FIG. 1, by the lamination of, using a photo-curable adhesive, two sheets of substrate made of polycarbonate having an outer diameter of 130 mm, inner diameter of 15 mm, and thickness of 1.2 mm with their recording medium layers 2 facing inside with each other, and also using, as a spacer material, a butyl rubber foam having a Tg of −72° C, a reversible elastic region of strain of 150%, specific gravity of 0.38 and an expansion ratio of 3.7. Referring to shapes of the spacers, they had a thickness of 0.6 mm; the outer peripheral part spacer had an outer diameter of 130 mm and an inner diameter of 123 mm; the inner peripheral part spacer had an outer diameter of 40 mm and an inner diameter of 15 mm.

Figure 4:
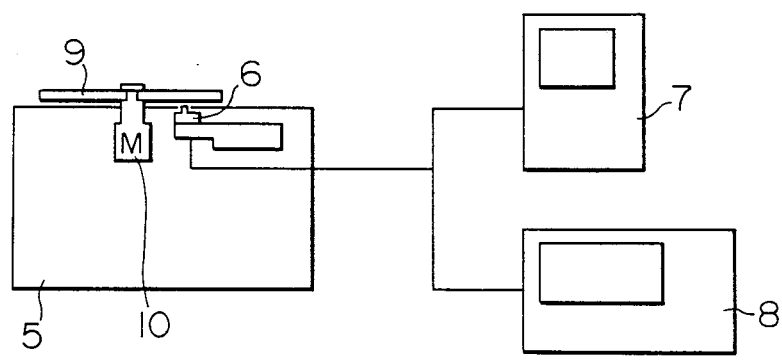
FIG. 4 a block diagram of an apparatus used for frequency analysis of the vibration characteristics of an optical disk.
Figure 5:
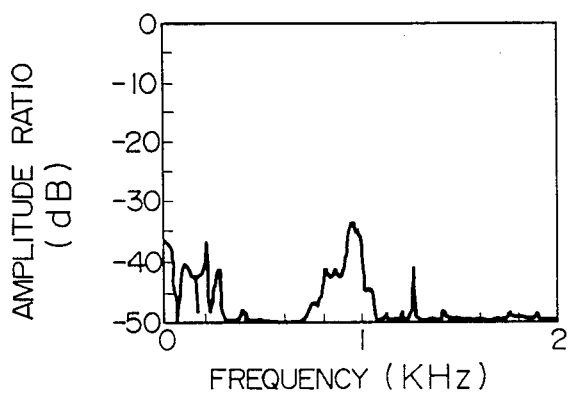

The vibration characteristics of the optical disk was examined by using a focus-error signal measuring apparatus as shown by the system diagram of FIG. 4. Thus, the disk drive 5 of the measuring apparatus had a spindle motor 10 built in thereto. The optical disk was loaded thereon. While the disk was rotated at a revolution speed of 1,800 rpm with an optical signal of a constant intensity generated from an optical head 6 at a point on the disk of 55 mm radiusly apart from its center, the focus-error signal was measured to be displayed on an oscilloscope 8 and at the same time subjected to frequency analysis on a FET (Fast Fourier Transform) analyzer 7. The results thus obtained are shown in FIG. 5. The maximum value of amplitude ratio was −33 dB. The smaller the value is, the more excellent the vibration restricting performance is, as well as the dynamic axial runout and the acceleration of dynamic axial runout tending to be smaller.

Recording and playback with this optical disk could be performed without any trouble over the whole surface of the disk.

EXAMPLE 2

An optical disk was prepared which had a similar structure to that in Example 1, by the lamination using a photo-curable adhesive and a natural rubber foam, as a spacer material, which has a Tg of −73° C, a reversible elastic region of strain of 300%, a specific gravity of 0.20 and an expansion ratio of 4.8. Shape of the spacer was 0.5 mm in thickness; the outer and the inner diameters were respectively similar to those in Example 1. When the optical disk was subjected to the drive of 1,800 rpm, it gave a good recording and playback over the whole surface.

Figure 6:
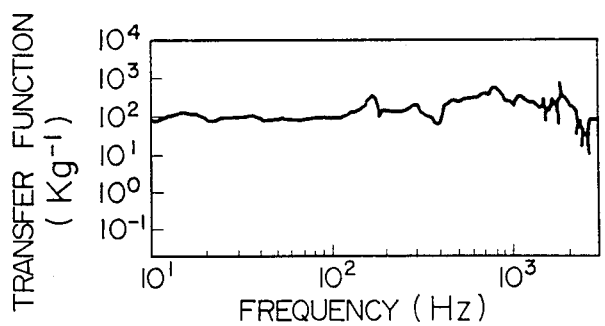
FIGS. 6 and 8 are respectively a chart showing the result of vibration analysis for the resonance of the optical disk in Example and Comparative Example, the transfer function being plotted as ordinates and the frequency as abscissa.

The resonance point and its magnitude of the optical disk were measured by means of determination of transfer function (i.e. inertance) between two points positioned in the radial direction (in the neighborhood of the inner periphery and of the outer periphery) through vibration analysis system GR-2506 manufactured by Gen Rad Co. and modal analysis software M-PLUS made by SDRC Co. The results thus obtained are shown in FIG. 6.

As to the transfer function, the smaller its peak value at the resonance frequency is, the more excellent the vibration restricting performance is, as well as the dynamic axial runout and the acceleration of dynamic axial runout tending to be smaller.

COMPARATIVE EXAMPLE 1

An optical disk was manufactured which had the same structure as that in Example 1 by the lamination with a photo-curable adhesive the same polycarbonate as that used as the substrate. The polycarbonate used for the spacer had a Tg of 150° C and shape of the spacer were same as in Example 1.

Figure 7:
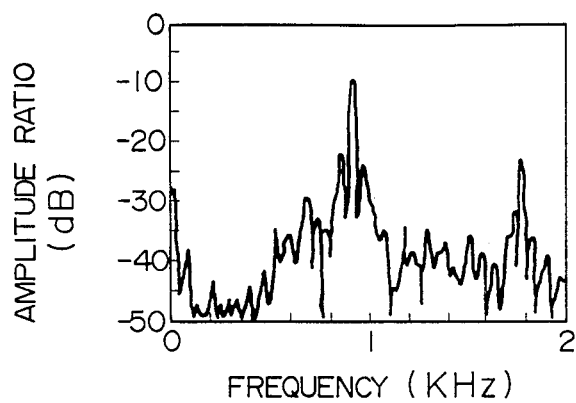
Figure 8:
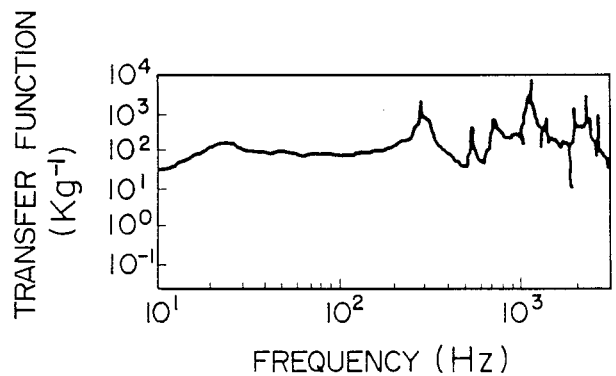

The optical disk obtained above was subjected to the drive with a revolution of 1,800 rpm. The focus-error signal was measured and the frequency analysis was carried out in the same manner as in Example 1 to obtain the results shown in FIG. 7. Further, the optical disk was subjected to a vibration analysis in the same manner as in Example 2 to obtain the results shown in FIG. 8.

Comparison with Examples 1 and 2 reveals clearly that the optical disk of this Comparative Example is poorer in vibration restricting performance.

Further, when the optical disk was allowed to run on the drive with a revolution of 1,800 rpm for recording and playback, it was found that in some parts of the disk near the inner and the outer periphery, the focus servo was ineffective, resulting in failure of recording.

COMPARATIVE EXAMPLE 2

Figure 9:
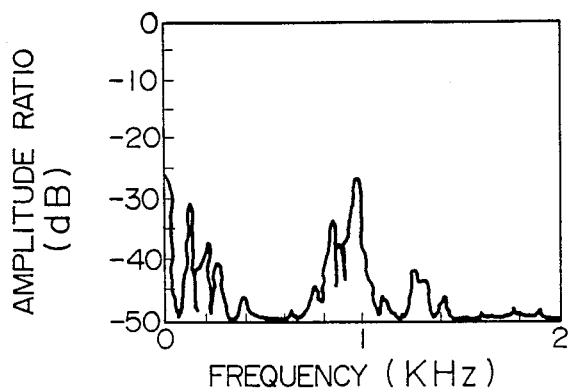
FIGS. 5, 7 and 9 are charts showing the vibration characteristics of the optical disks in Examples and Comparative Examples based on focus-error signals obtained when the disk is subjected to a disk drive, the amplitude ratio being plotted as ordinates and the frequency as abscissas.

An optical disk was prepared which had a similar structure to that in Example 1 except that chloroprene rubber of a Tg of −50° C, reversible elastic region of strain of 200% and specific gravity of 1.20 was used as an elastomer spacer which was then laminated by means of a photo-curable adhesive. The thickness of the spacer was 0.5 mm; the outer and the inner diameters were the same as those in Example 1. Evaluation of the optical disk conducted in the same manner as in Example 1 showed that, although recording and playback could be carried out by and large without trouble, the vibration restricting performance of the disk was poor as compared with those in Examples 1 and 2 as shown in FIG. 9.

WHAT IS CLAIMED IS:

1. An optical disk comprising an assembly of two sheets of substrate which are bonded to form an integrated body having a spacer interposed therebetween, said spacer being made of an elastomeric foam material having a specific gravity of not more than 1.5 and an expansion ratio of 1.5 to 15, the elastomer of the foam material having a glass transition temperature of not more than 30° C and a reversible elastic region of strain of 1 to 2000%.

2. An optical disk according to claim 1, wherein said elastomer has a glass transition temperature of not more than 0° C and a reversible elastic region of strain of 100 to 1000%.

3. An optical disk according to claim 2, wherein said spacers are disposed at the inner and outer periphery parts of the optical disk.

4. An optical disk according to claim 1, wherein said elastomeric foam material has an expansion ratio of 3 to 10.

5. An optical disk according to claim 4, wherein said spacers are disposed at the inner and outer periphery parts of the optical disk.

6. An optical disk according to claim 1, wherein said spacers are disposed at the inner and outer periphery parts of the optical disk.

7. An optical disk of claim 1, wherein the assembly further comprises a reinforcing plate.

8. An optical disk of claim 1, wherein the assembly further comprises a reinforcing rim.

9. An optical disk comprising an assembly of one sheet of substrate and a reinforcing plate, which are bonded to form an integrated body having a spacer interposed therebetween, said spacer being made of an elastomeric foam material having a specific gravity of not more than 1.5 and an expansion ratio of 1.5 to 15, the elastomer of the foam material having a glass transition temperature of not more than 30° C and a reversible elastic region of strain of 1 to 2000%.

10. An optical disk according to claim 9, wherein said elastomer has a glass transition temperature of not more than 0° C and a reversible elastic region of strain of 100 to 1,000%.

11. An optical disk according to claim 9, wherein said elastomeric foam material has an expansion ratio of 3 to 10.

12. An optical disk according to claim 9, wherein said spacers are disposed at the inner and outer periphery parts of the optical disk.

13. An optical disk according to claim 10, wherein said spacers are disposed at the inner and outer periphery parts of the optical spacer.

14. An optical disk according to claim 11, wherein said spacers are disposed at the inner and outer periphery parts of the optical disks.

* * * * *